B. H. BLOOD.
LINEAR MEASURING MACHINE.
APPLICATION FILED JAN. 31, 1920.

1,389,341.

Patented Aug. 30, 1921.
2 SHEETS—SHEET 1.

Inventor
Bryant H. Blood
By S. Jay Teller
Attorney

B. H. BLOOD.
LINEAR MEASURING MACHINE.
APPLICATION FILED JAN. 31, 1920.
1,389,341.
Patented Aug. 30, 1921.
2 SHEETS—SHEET 2.
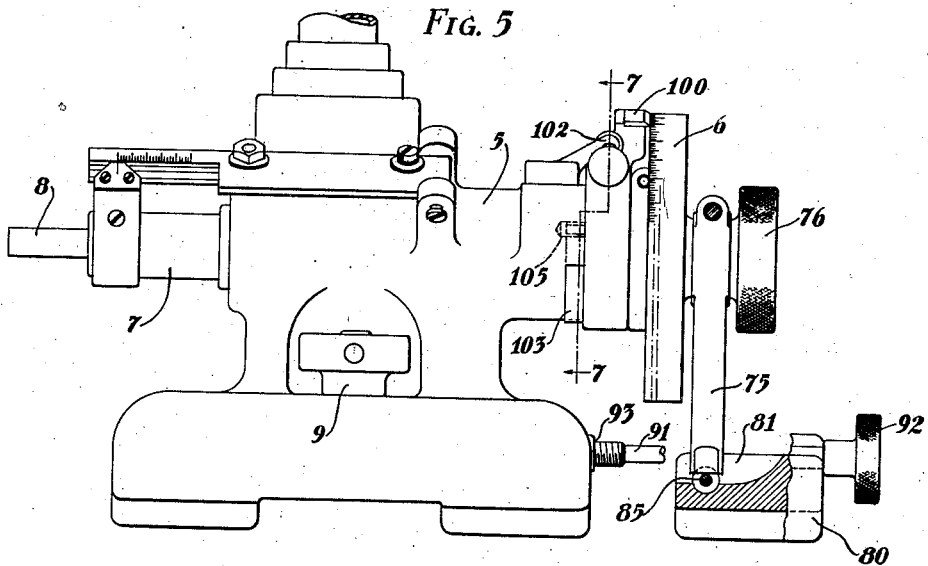
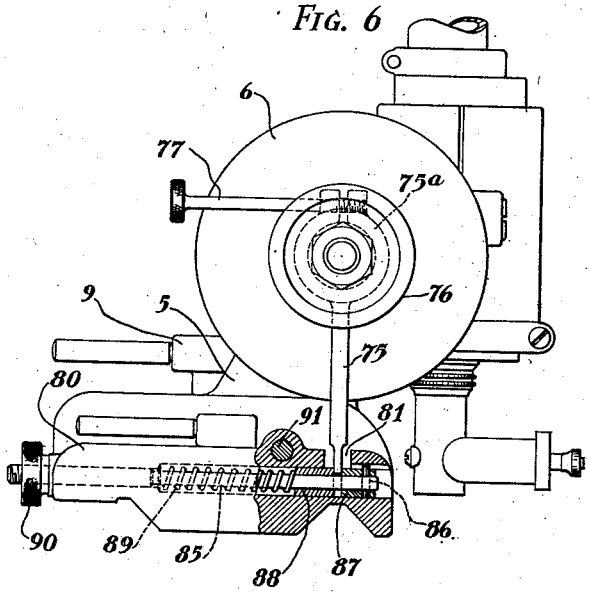
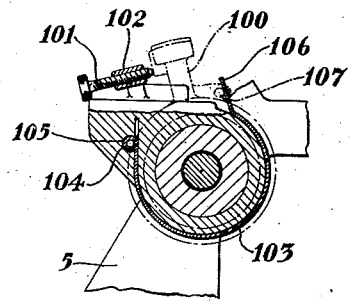
Inventor
Bryant H. Blood
By S. Jay Teller
Attorney

UNITED STATES PATENT OFFICE.

BRYANT H. BLOOD, OF HARTFORD, CONNECTICUT, ASSIGNOR TO PRATT & WHITNEY COMPANY, OF NEW YORK, N. Y., A CORPORATION OF NEW JERSEY.

LINEAR-MEASURING MACHINE.

1,389,341.  Specification of Letters Patent.  Patented Aug. 30, 1921.

Application filed January 31, 1920. Serial No. 355,466.

*To all whom it may concern:*

Be it known that I, BRYANT H. BLOOD, a citizen of the United States, residing at Hartford, in the county of Hartford and State of Connecticut, have invented certain new and useful Improvements in Linear-Measuring Machines, of which the following is a specification.

This invention relates to improvements in linear measuring machines and more particularly to improvements applied to a standard form of precision measuring machine.

The principal object of the invention is to provide means for more accurately measuring a given object than possible in measuring machines now commonly used.

Another object of the invention is to provide means for determining exactly when the right measuring position has been obtained with the measuring plungers in contact with the object being measured.

A further object is to provide means to operate a visible or audible signal to notify or warn the operator when the proper measuring position has been obtained without necessitating his attention, being distracted from observation of the measuring mechanism.

A further object is to provide an electric circuit for operating the signal which will permit operation of the signal when the position of the measuring plunger is in absolute adjustment.

Another object of the invention is to provide means for permitting a very carefully regulated and slow movement of the measuring plunger and a still further object is to provide a more delicate and precise means for adjusting the zero arm provided on the headstock adjacent the indicating dial.

In the drawings annexed hereto and forming a part of this specification:

Figure 1 shows a general outline of a measuring machine to which my present improvements are particularly adapted to be applied;

Fig. 2 a view in section of the tailstock forming a part of the present invention;

Fig. 3 an end elevation of the tailstock shown in Fig. 2;

Fig. 4 a diagrammatic view of parts used in connection with the tailstock together with a diagram of the electric circuit.

Fig. 5 is a front elevation of the headstock of the measuring machine to which some of my improvements have been applied.

Fig. 6 is an end elevation of the same.

Fig. 7 is a section of the headstock taken on the line 7—7 of Fig. 5.

Figure 1:
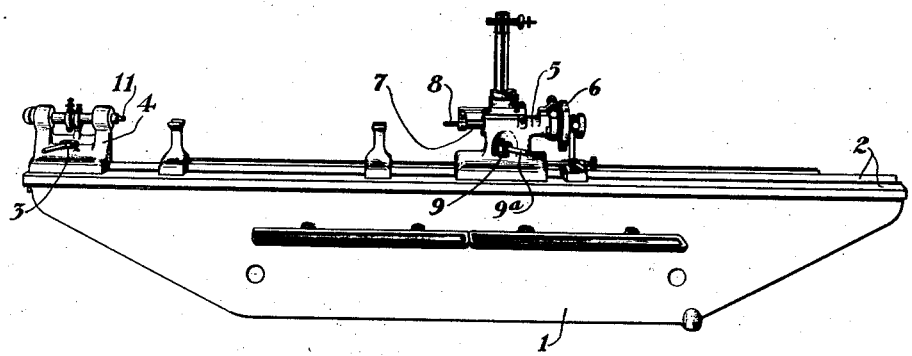
Figure 2:
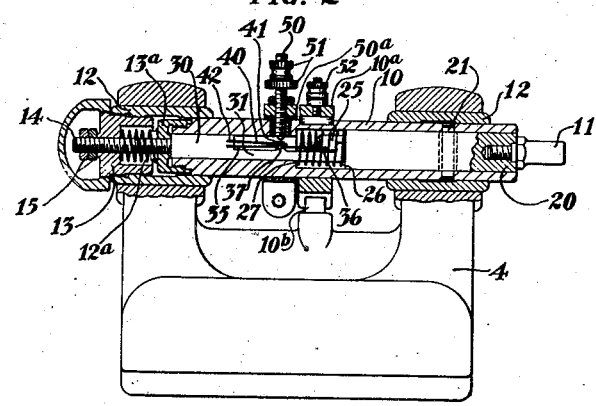
Figure 3:
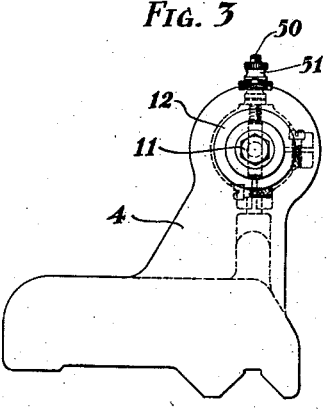

In the above mentioned drawings I have shown the embodiment of the invention which I now deem preferable but it is to be understood that changes and modifications may be made within the scope of the appended claims without departing from the spirit of the invention.

As illustrated in the drawings, the embodiment of the invention in its entirety comprises the following principal devices which may be attached to or provided for a standard form of measuring machine having the usual tailstock, headstock, and a measuring plunger and dial mounted on the headstock. First, the devices forming the present invention comprise a signaling or indicating means mounted within the tailstock which closes an electric circuit and operates a signal when the measuring machine is in adjusted position and ready for a measurement to be taken; second, an improved device for very gradually moving the measuring dial and spindle during the operation of the machine; third, an improved means for adjusting the position of the zero arm also mounted on the headstock, and fourth, an electric circuit particularly adapted to operate the signaling means.

Referring more specifically to the figures in the drawing, a base 1 is provided which may be of any of the usual or standard types providing a rigid and solid bed and having guide-ways 2 formed on the upper surface thereof. Adjustable thereon to any position and adapted to be clamped thereto by means of a screw and handle 3 is a tailstock 4 which is provided on its lower side with a groove and a surface carefully fitted to correspond to the guide-ways 2 on the upper surface of base 1.

At 5 is shown a standard form of measuring head having an indicating dial 6 and measuring plunger 7, carrying an anvil 8, rotation of the indicating dial 6 serving to move the plunger 7 forward and rearward, into and out of measuring contact with an object. Measuring head 5 is also slidably mounted on the base 1 and may be secured thereto in any adjusted position by means of a locking screw 9 controlled by means of a handle 9ª.

Referring first to the improvements provided in the tailstock 4, this part is provided with an outer plunger 10 of usual form lying horizontally therein and in alinement with the headstock plunger 7 in the headstock 5. The plunger 10 is mounted within the bearings 12 provided on the tailstock 4 to permit a limited longitudinal movement. A collar 10ª is clamped to the plunger 10 and is provided at its bottom with a slot into which is entered a pin 10ᵇ on the body of the tailstock. This keeps the plunger from turning. In order to adjust the position of the plunger 10 accurately, a bushing 13 is screwed into one of the bearings 12 through which bushing extends a threaded member 14 which may be adjustably secured to the bushing 13 by means of nuts 15. Mounted between the bushing 13 and the rear surface of a screw cap 13ª screwed on to the rear end of plunger 10 is a helical spring 12ª tending to hold the plunger 10 in its forward position, the forward limit of movement of plunger 10 being determined by the position of nuts 15 on the screwed member 14.

From this construction it will be seen that the plunger 10 is resiliently held forward in the bearings 12, the spring 12ª being of sufficient force to prevent backward movement of outer plunger 10 during the time when measurements are being taken. If, however, the proper measuring pressure is exceeded above a safe limit spring 12ª will be compressed thus allowing the outer plunger 10 to move rearward and prevent any damage being done to the machine.

Carefully fitted to and slidable within the forward end of the plunger 10, is a member 20 forming another plunger to which the contact anvil 11 is directly fastened. This member or plunger 20 has a limited movement forward and rearward within outer plunger 10, relative rotative movement being prevented by a pin 21 extending directly through the inner plunger 20 and engaging suitable holes provided in the outer plunger 10, the length of the hole through the plunger 20 being slightly greater than the diameter of the pin 21.

At the rear end of plunger 20, a hooked extension member 25 is provided and against the end of the full diametered portion of the plunger 20 a spring 26 is fitted, this spring taking up at its opposite end against a shoulder 27 provided in the main spindle or outer plunger 10. Extending through a suitable longitudinal hole in the rearward portion of the plunger 10 is a member 30 connected with the member 14 and having an extension 31 at its forward end, its extreme end 31ª being turned up and held within the hooked member 25 provided on the plunger 20, a slight relative movement between the member 31 and hooked member 25 being permitted. Attached to the member 30 at one end 35ª is a leaf spring 35 which at its forward or opposite end is secured as shown at 36 in the hooked portion 25 of member 20. The leaf spring member 35 is held in slightly bent or deflected position, its middle point being held slightly raised above its ends by means of a projection 37 provided on the extension member 31.

It will thus be seen from the above description that with the parts adjusted as shown and with the object being measured lightly pressed against the measuring anvil 11, by means of the adjustment of the measuring anvil 8, the leaf spring 35 will be deflected upwardly when the resiliency of leaf spring 35 and helical spring 26 is overcome by the measuring pressure applied against the anvil 11.

Mounted directly over and pressing against the spring 35 is a flexible leaf 40 carrying at its outer extremity an electrical contact 41 and at its other end being rigidly secured as shown at 42 to the member 30. The leaf 40 is made of copper or other metal which is a good electrical conductor, thus making it unnecessary for any considerable current to flow through the leaf spring 35. The contact 41 is mounted directly over the central portion of spring 35 and thus will be carried upwardly with the spring 35 when this spring is deflected or buckled by pressure applied against the anvil 11. Adjustably mounted within a collar 50ª and surrounding but completely insulated from the plunger 10 is a contact member 50. In the present instance this is shown merely as a threaded member or screw movable in and out of the collar 50ª and extending through a suitable hole in the plunger 10 to a position just above the leaf spring 35. A binding screw 51 is provided on the outer end of the contact member 50 to secure one of the wires in the electric circuit to be described more fully hereafter.

Figure 4:
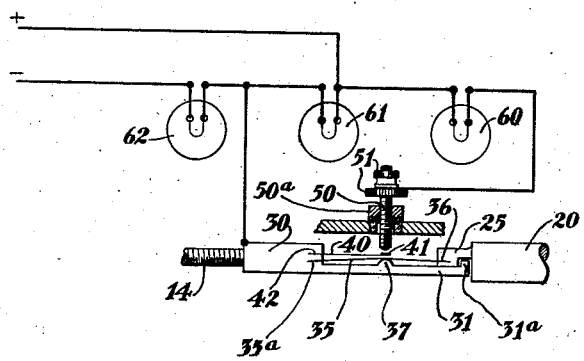

Referring now to the diagrammatic view shown in Fig. 4, the electrical circuit for indicating the movement of the anvil 11 and deflection of spring 35 is shown.

One terminal of an electrical circuit is attached to the insulated adjustable contact 50, the other terminal is connected to any convenient part of the machine as for instance the collar 10ª, use being made of the nut 52. Between these two terminals and the source of current are lamps 60 and 61 or other electrical resistance operated devices. Another lamp 62 or convenient signal is also in the circuit but mounted beyond lamps 60 and 61. Resistance or lamp 61 and signal 62 are mounted in series in the line so that they have current always passing through them but these two devices being in series, each of them has but one half the voltage between their terminals that is available at the source of current. A wire forming a part of the circuit in which the lamp 60 is mounted is connected between the resistance 61 and signal 62, the other wire of this part of the circuit being joined at the point in the circuit at which the lamp or resistance 61 is mounted. It will thus be seen that as soon as the contacts 41 and 50 are joined, current passes through the part of the circuit in which the lamp 60 is mounted thus forming a path for the current to flow around the resistance 61. This has the effect of lessening the resistance in this part of the circuit and so increases the current and voltage for the lamp or signal 62. The increased voltage and current supplied lamp 62 cause it to become much brighter thus serving as a suitable signal means. If desired, the lamp 60 may be utilized as a signal, as this lamp is entirely dark until the contacts 41 and 50 are brought together. It will be noted, however, that in the circuit described the lamp 60 would be always in series with another lamp and consequently would not become as bright as the lamp 62. From the above it will be seen that as soon as the proper measuring position and pressure has been obtained by the definite amount of movement of anvil 11 in the plunger 10 and deflection of the spring 35 necessary to close the contacts 41 and 50, the lamp 62 will be greatly increased in brilliancy, thus indicating to the operator exactly the adjustment of the machine at which the object is to be measured.

While I have shown a visible signal to indicate the measuring position of plunger 20 and anvil 11, it is to be understood that the invention is not limited thereto but any suitable signal either visible or audible may be operated by closing the contact between 41 and 50.

Preferably the lamps 60 and 61 may be suitably inclosed and thus may be invisible to the operator, the lamp 62 only being mounted in position for its light to be readily seen by the operator. Any suitable electric circuit may be utilized which will operate a signal such as a lamp or bell or other device at the proper measuring adjustment by electrical means, but I have found the above circuit to be preferable for the reason that it provides a method of closing the contact between the points 41 and 50 without the formation of a spark which might be formed under certain conditions in other circuits before the points 41 and 50 were in contact, and operating the signal before the deflection of spring 35 had reached its critical amount. This sparking is prevented or greatly reduced in the described circuit by reason of the fact that there is always a flow of current through a part of the circuit and closing the branch or shunt circuit in which the lamp 60 is located by closing of the contacts 41 and 50 serves only to decrease the resistance in that part of the circuit and increase by a small amount, the current passing through the lamp 62. In the same way sparking, when the circuit through contact 50 and the leaf spring 35 is broken, is prevented by reason of the fact that the resistance of lamp 61 is always included in the circuit. Preventing sparking when the circuit is broken also obviates the possibility of the contacts becoming burnt or roughened.

The above embodiment of the invention and the means described above provide a very accurate way of determining the exact closing of the circuit and thus a precise method of obtaining identical measuring adjustments during the use of the measuring machine. It is to be understood that the means above described may be varied materially without departing from the scope of the invention as defined in the adjoined claims.

Referring now to the improvements in the measuring head 5 and in particular to the slow motion device for very gradually moving the indicating dial 6, this mechanism comprises generally an arm 75 adapted to be clamped about a part of the indicating dial 6. The indicating dial 6, as usually provided in machines of this type, is provided with a knob 76 by means of which it may be operated thus operating the plunger 7 and contact 8 to which it is directly attached. It is obvious, however, that the knob 76 could not be used to advantage to gradually move the indicating dial 6 through a very small angle until a critical point is reached. It is, therefore, for the purpose of moving the indicating dial 6 through a small angle when the reading is about to be taken and the plunger 7 brought to measuring position, that the arm 75 is provided. The arm 75 as shown clearly in Fig. 5 may be secured about a reduced neck portion between the graduated portion of indicating dial 6 and the knob 76 and may be tightly clamped to this neck portion in any position of the dial by means of screw 77 which tends to clamp a split portion 75ª of the arm 75 to tightly surround the neck portion of the indicating dial 6. It will thus be seen that during a rapid movement of the indicating dial 6 to approximately position this member, the knob 76 may be used and as soon as the dial 6 has been brought approximately to measuring or reading position the arm 75 may be clamped to the reduced portion of the indicating dial 6 by means of screw 77 and further movement of the indicating dial 6 be accomplished by means of moving the lower end of the arm 75.

In order to very gradually move the arm 75, the following mechanism is provided. In the adjusting block 80 which is similar to those usually found in standard measuring machines for initially positioning the headstock 5, a slot is cut as shown at 81. This positioning block 80 is provided with a screw 91 having a knurled head 92 and is adapted to rotate within a hole provided in the block 80 without longitudinal movement relative thereto. The end of the screw 91 is inserted in a tapped hole 93 provided in the measuring head 5 so that rotation of the screw after the positioning block 80 has been clamped to the base 1 will accurately position the measuring head 5 on the guide-ways 2. The arm 75 extends into this slot and at its extreme lower end is engaged by members mounted on a screw 85. The screw 85 which extends through the positioning block 80 is preferably provided at its inner end with a pin 86 passing through a bushing 87 so that the bushing is rigidly secured to the inner end of screw 85. Against one end of this bushing 87 the arm 75 is adapted to press, being held in this position by means of a bushing 88 also mounted on the screw 85 and engaging the opposite side of the arm 75. Spring 89 interposed between the bushing 88 and a shoulder formed in the positioning block 80 resiliently presses against the bushing 88. Preferably the spring 89 is in the form of a helix surrounding the screw member 75 and contained wholly within a hole provided in the positioning block 80. At the outer end of screw 75 a knurled nut 90 is provided so that rotation of the nut 90 gradually forces the screw member 85 in one direction or the other, it being resiliently held toward its rearward position by the spring 89. The above construction has been described in detail and is the preferred construction of the embodiment of this invention, but it is obvious that any form of screw member may be provided, rotation of which will gradually move the extreme end of an arm 75 and thus give a very slow, easily regulated movement to the dial 6.

Referring now to the improvement in the means for maintaining and positioning the zero arm, this construction is clearly shown in Fig. 7, reference being had also to Fig. 5. As is usual in the standard precision measuring machine, an arm is provided, rotatable within restricted limits about the same axis as the measuring plunger and adjacent the indicia on the dial member 6. This arm has at its outer end either a single line which is the zero line or a vernier by means of which still more accurate measurements may be determined. For convenience this arm is referred to as the zero arm. This arm 100 is held against a screw 101 extending through a projection 102 of the measuring head 5. This is accomplished by means of a spring 103. Spring 103 at one end is coiled as shown at 104 and the loop inserted in a drilled hole 105 as shown in Fig. 5. The spring 103 is suitably curved throughout its length to form a part of a circle of large enough radius to surround a part of the measuring head 5 and, from the drilled hole 105 in which one end 104 is inserted, the spring extends downwardly and surrounds the headstock 5. The opposite side or free end 106 of the spring 103 which may be suitably extended resiliently presses against a pin 107 carried by the zero arm 100. This construction thus provides a resilient means continuously pressing the arm 100 against the screw 101 and it therefore will be obvious from the above construction that to vary the position of the arm 100 it is only necessary to vary or adjust the position of the screw 101 which will thus force the arm 100 into any desired position.

What I claim is:

1. An attachment for a measuring machine tailstock comprising in combination, a plunger adapted to move longitudinally within said tailstock, resilient means resisting movement of said plunger in one direction, and means operated by movement of said plunger in said direction to close a shunt branch of an electric circuit.

2. A measuring machine tailstock comprising in combination a longitudinally movable plunger, means resisting movement of said plunger in one direction, and means deflected by movement of said plunger in said direction to close an electric circuit.

3. A measuring machine tailstock comprising in combination a longitudinally movable plunger, resilient means resisting movement of said plunger in one direction, and means deflected by movement of said plunger in said direction to open or close an electric circuit.

4. A measuring machine tailstock comprising in combination a longitudinally movable plunger, means resisting movement of said plunger in one direction, means operated by movement of said plunger in said direction to open or close an electric circuit, and means to vary the amount of movement of said plunger necessary to close said circuit.

5. A measuring machine tailstock comprising in combination a longitudinally movable plunger, means resisting movement of said plunger in one direction, and a flat spring deflected by movement of said plunger in said direction to close an electric circuit.

6. A measuring machine tailstock comprising in combination a longitudinally movable plunger, means resisting movement of said plunger in one direction, and a flat spring normally held slightly deflected and deflected to a predetermined maximum amount by movement of said plunger in said direction to open or close an electric circuit.

7. An attachment for a measuring machine tailstock comprising in combination, a plunger adapted to move longitudinally within a tailstock, means resisting movement of said plunger in one direction, and a flat spring normally held slightly deflected and adapted to be deflected to a predetermined maximum amount by movement of said plunger in said direction to open or close an electric circuit.

8. An attachment for a measuring machine comprising in combination, a plunger adapted to move longitudinally within a tailstock, means resisting movement of said plunger in one direction, a flat spring, a projection normally holding said spring slightly deflected, said spring being adapted to be deflected to a predetermined maximum amount by movement of said plunger in said direction to close an electric circuit.

9. A measuring machine tailstock comprising in combination, a longitudinally movable plunger, a spring mounted to resist movement of said plunger in one direction, movement of said plunger in said direction deflecting said spring, and a contact resting on and movable with said spring, the deflection of said spring to a predetermined degree closing an electric circuit.

10. An attachment for a measuring machine tailstock comprising in combination, a plunger adapted to move longitudinally with said tailstock, a spring mounted to resist movement of said plunger in one direction, movement of said plunger in said direction deflecting said spring, and a contact mounted on and movable with said spring, the deflection of said spring to a predetermined degree opening or closing an electric circuit.

11. An attachment for a measuring machine tailstock comprising in combination, a plunger adapted to move longitudinally, a spring mounted to resist movement of said plunger in one direction, movement of said plunger in said direction deflecting said spring, a contact resting on and movable with said spring, the deflection of said spring to a predetermined degree causing said contact to engage another contact adjustably mounted above said first named contact and close an electric circuit.

12. A measuring machine comprising in combination, a headstock, a tailstock, plungers mounted in said head and tailstocks, a spring associated with one of said plungers, movement of said latter plunger away from the other deflecting said spring, and means operated by the deflection of said spring to close an electric circuit when the deflection of said spring reaches a predetermined amount.

13. A measuring machine comprising in combination, a headstock, a tailstock, plungers mounted in said head and tailstocks, a spring associated with one of said plungers, movement of said latter plunger away from the other deflecting said spring, means operated by the deflection of said spring to close an electric circuit when the deflection of said spring reaches a predetermined amount and means permitting additional longitudinal movement of said last named plunger after the circuit has been closed.

14. A measuring machine comprising in combination, a headstock, a tailstock, plungers mounted for longitudinal movement in said head and tailstocks, resilient means forcing one of said plungers toward the other, and means to close an electric circuit when said last named plunger is forced away from the other against the pressure of said resilient means.

15. In an electric circuit for a measuring machine, in combination, terminals adapted to be connected to a source of electric supply, an electrically operated device directly connected in said circuit, another electrically operated device adapted to be connected in said circuit when the adjustment of the measuring machine reaches a predetermined amount, and a signal device operated thereby.

16. In an electric circuit for a measuring machine, in combination, terminals adapted to be connected to a source of electric supply, an electrically operated device directly connected in said circuit, a branch electric circuit adapted to be closed when the measuring machine is in measuring adjustment, and indicating means operated by the closing of said circuit.

17. In an electric circuit for a precision linear measuring machine, in combination, terminals adapted to be connected to a source of electric supply, and an electrically operated indicating device adapted to be brought into operation when the measuring machine is in measuring adjustment.

18. A measuring machine comprising in combination, a headstock, a measuring plunger therein, a graduated indicating dial attached to said plunger whereby the longitudinal position of said plunger may be determined, an arm adjustably attached to said indicating dial, and means for slowly moving said arm.

19. A measuring machine comprising in combination, a headstock, a measuring plunger therein, a graduated indicating dial attached to said plunger whereby the longitudinal position of said plunger may be determined, an arm adjustably and detachably attached to said indicating dial, and means for slowly moving said arm.

20. A measuring machine comprising in combination, a headstock having a measuring plunger therein, a graduated indicating dial attached to said plunger, a positioning block adjustably attached to said headstock, an arm adjustably attached to said indicating dial, and means mounted in said positioning block to slowly move said arm and indicating dial.

21. An attachment for measuring machines comprising in combination, an arm adapted to be adjustably clamped to a dial member for a measuring machine and means adapted to be clamped to a measuring machine base to slowly move said arm about the axis of said measuring machine indicating dial.

22. A measuring machine comprising in combination, a headstock having a measuring plunger therein, a graduated indicating dial attached to said plunger, a positioning block adjustably attached to said headstock, an arm adjustably and detachably attached to said block to slowly move said arm and indicating dial.

23. A measuring machine comprising in combination, a headstock having a measuring plunger therein, a graduated indicating dial attached to said plunger, a positioning block adjustably attached to said headstock, an arm adjustably attached to said indicating dial, and means comprising a screw and nut mounted in said positioning block to slowly move said arm and indicating dial.

24. A measuring machine comprising in combination, a headstock, a measuring plunger therein, a graduated indicating dial attached to said plunger whereby the longitudinal position of said plunger may be determined, an arm adjustably attached to said indicating dial, and means comprising a screw and nut for slowly moving said arm.

25. An attachment for measuring machines comprising in combination, an arm adapted to be adjustably clamped to an indicating dial for a measuring machine, means comprising a member adapted to be clamped to the base of a measuring machine, and means comprising a screw and nut mounted in said last mentioned member to slowly move said arm about the axis of said indicating dial.

26. A measuring machine comprising in combination, a headstock, a measuring plunger therein, a graduated indicating dial attached to said plunger whereby the longitudinal position of said plunger may be determined, an arm adjustably attached to said indicating dial, a screw mounted transversely to said arm, and means connecting said arm and screw so that rotation of said screw will slowly rotate said indicating dial.

27. A measuring machine comprising in combination, a headstock, a measuring plunger therein, a graduated indicating dial attached to said plunger whereby the longitudinal position of said spindle may be determined, an arm detachably attached to said indicating dial, a screw mounted transversely to said arm, and means comprising a spring and bushing surrounding said screw for connecting said arm and screw so that rotation of said screw will slowly rotate said indicating dial.

28. A measuring machine comprising in combination, a headstock, a measuring plunger therein, a zero carrying arm, and a spring surrounding said headstock and attached at one end to a part of said headstock, the other end of said spring pressing against the zero arm.

29. A measuring machine comprising in combination, a headstock, a measuring plunger therein, a zero carrying arm, said arm being rotatable about the axis of said plunger, and a spring surrounding said plunger and attached at one end to a part of said headstock, the other end of said spring pressing against the zero arm.

30. A measuring machine comprising in combination, a headstock, a measuring plunger therein, a zero carrying arm, said arm being rotatable about the axis of said plunger, a spring surrounding said plunger and attached at one end to a part of said headstock, the other end of said spring pressing against the zero arm, and a screw pressing against said arm whereby rotation of said screw will permit the arm to be adjusted to any desired position.

In testimony whereof, I hereto affix my signature.

BRYANT H. BLOOD.